No. 782,039. PATENTED FEB. 7, 1905.
A. C. V. MERRIFIELD & H. POTTER.
EGG OPENER.
APPLICATION FILED AUG. 16, 1904.
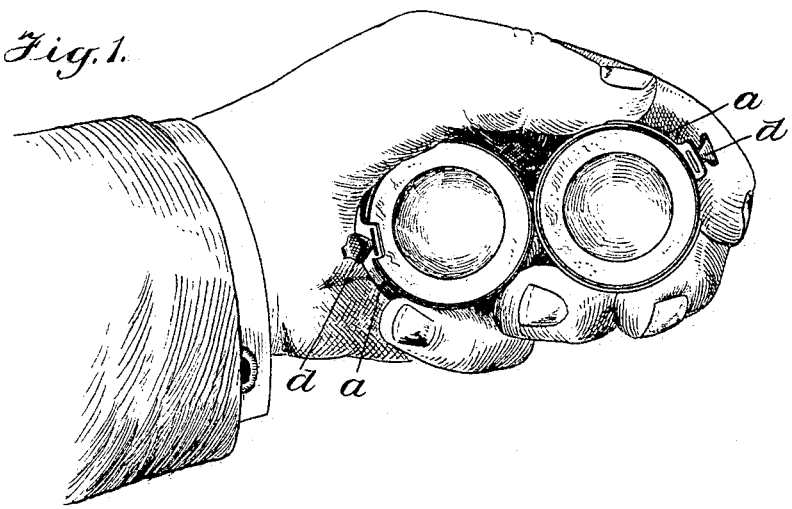
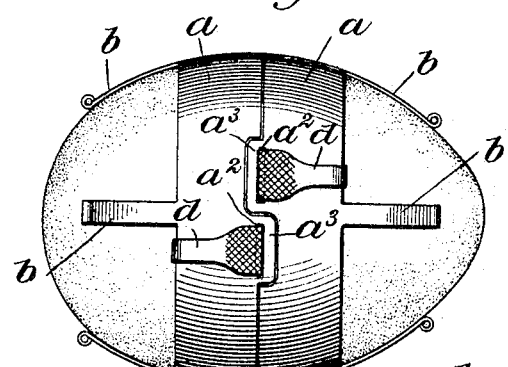
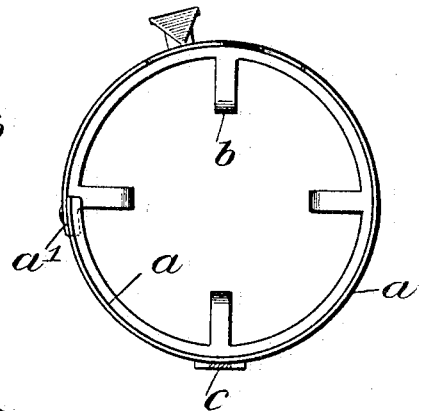
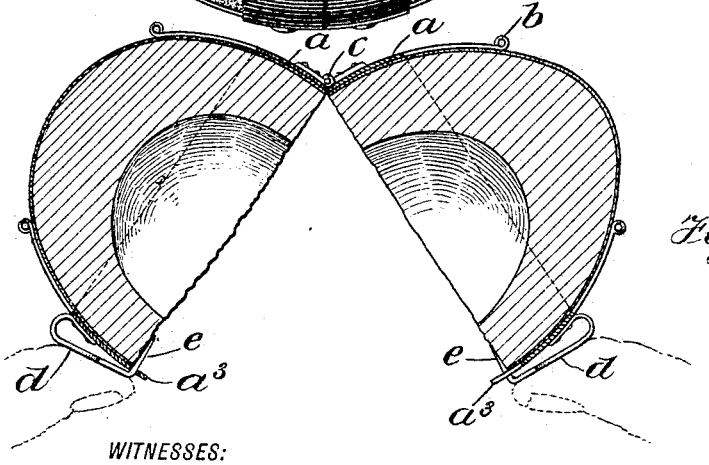
WITNESSES:
INVENTORS
Arthur C. V. Merrifield
Henry Potter
BY
ATTORNEYS No. 782,039.

Patented February 7, 1905.

UNITED STATES PATENT OFFICE.

ARTHUR C. V. MERRIFIELD AND HENRY POTTER, OF NEW YORK, N. Y.

EGG-OPENER.

SPECIFICATION forming part of Letters Patent No. 782,039, dated February 7, 1905.

Application filed August 16, 1904. Serial No. 220,977.

*To all whom it may concern:*

Be it known that we, ARTHUR C. V. MERRIFIELD and HENRY POTTER, citizens of the United States, and residents of the city of New York, borough of Manhattan, in the county of New York and State of New York, have invented a new and Improved Egg-Opener, of which the following is a full, clear, and exact description.

The invention relates to a device for facilitating the opening of eggs. It is intended for various uses, but particularly for hotel and restaurant work.

It is well known, particularly among hotel and restaurant men, that great inconvenience and annoyance is occasioned in serving boiled eggs, which are generally opened by the waiter in the presence of the customer and which practice frequently results in spilling part of the eggs and soiling the table-linen and producing an unpleasant effect upon the customer.

Our invention seeks to overcome this condition; and it consists, therefore, in a novel or peculiarly-constructed device adapted to embrace the egg and provided with one or more blades which serve to make an incision or incisions in the egg-shell, facilitating breaking the shell apart, the device then holding the two parts of the shell in a position to facilitate the removal of their contents with perfect cleanliness and ease.

Reference is had to the accompanying drawings, which show as an example the preferred embodiment of the invention, and in which drawings like characters of reference indicate like parts in the several views, in which—

Figure 1 is a view illustrating the device in use, showing the parts of the shell separated and ready to have their contents removed therefrom. Fig. 2 is a plan view of the device engaged with the egg preparatory to using the same. Fig. 3 is a sectional view showing the egg open and the parts inverted to permit dropping the yolk; and Fig. 4 is an inner end elevation of one of the two parts of the device, a hinge between said parts being shown in section.

Each part of the device comprises a main part or band $a$, formed of resilient material and having its ends overlapped, as indicated at $a'$ in Fig. 4, to permit enlarging or contracting the bands by pressure thereon, thus adapting it to eggs of various sizes. Each band $a$ is also provided with a suitable number of outwardly-projecting spring-fingers $b$, adapted to lie against the egg, as shown in Fig. 2, so as to hold the same firmly in position. The two bands $a$ are connected by a hinge $c$, so that they may move toward and from each other, as indicated in Figs. 1 and 3. Attached to each band is a spring-arm $d$, and said arms have their free ends widened and roughened to permit convenient manipulation, and each arm carries at its free end an inwardly-projecting blade $e$, which blades are adapted to extend through slots $a^2$ in the bands $a$, so as to be pressed into the egg to make incisions in the shell thereof. The blades $e$ are placed in line with each other when the sections or bands $a$ are engaged by providing each band with a projecting portion $a^3$, these projecting portions allowing the slots $a^2$ to be placed in line with the meeting edges of the bands.

In using the device the two sections are moved apart and the egg introduced between them, after which the sections are closed against each other, as shown in Fig. 2. The device is now clasped, one section in each hand of the user, and the arms $d$ are pressed inward, causing the blades $e$ to enter the shell and make two incisions therein. After this is done the sections should be moved apart, as Fig. 3 illustrates, the blades $e$ being kept pressed while engaged with the shell, this resulting in breaking the shell apart in two sections, as shown. As this breaking movement is effected the egg should be inverted, allowing the yolk to drop therefrom into the glass or other receptacle intended to receive the egg. The two parts of the opening device, with the sections of the egg engaged therein, may now be held in one hand, as Fig. 1 illustrates, leaving the other hand of the operator free to handle a spoon to remove the white of the egg, and then by relaxation of the pressure on the two bands $a$ they are allowed to expand, thus releasing the two parts of the egg-shell and allowing them to drop. It will be seen, therefore, that this device not only enables the egg to be opened quickly, but it also avoids crushing the shell, spilling the contents thereof, and various other disadvantages well known coincident to the ordinary manner of doing this work.

Various changes in the form, proportions, and minor details of our invention may be resorted to at will without departing from the spirit and scope thereof. Hence we consider ourselves entitled to all such variations as may lie within the terms of our claims.

Having thus described our invention, we claim as new and desire to secure by Letters Patent—

1. An egg-opener comprising two sections each formed of a resilient band having its end overlapped and loosely engaged together for the purpose specified, a means for hingedly connecting the bands at each side, and a means removed from the first-named means for making an incision in the shell of the egg.

2. An egg-opener comprising two sections, each formed of a resilient band having its end overlapped and loosely engaged together for the purpose specified, a means for hingedly connecting the bands at each side, a means removed from the first-named means for making an incision in the shell of the egg, and resilient fingers projecting from said bands to assist in holding the egg in place.

3. An egg-opener comprising two parts, each formed of a resilient band, means for hingedly connecting the bands together, each band having a projecting portion removed from the said means for hingedly connecting the bands, said projecting portions being slotted so that the slots are essentially alined when the bands are engaged with each other, and blades mounted on the bands and movable respectively through the slots thereof for the purpose specified.

In testimony whereof we have signed our names to this specification in the presence of two subscribing witnesses.

ARTHUR C. V. MERRIFIELD.
HENRY POTTER.

Witnesses:
W. J. RAFFERTY,
WILLIAM J. MURRAY.